Feb. 10, 1942.  A. B. McLAUCHLAN  2,272,415
PITTER
Filed July 30, 1940  2 Sheets-Sheet 2

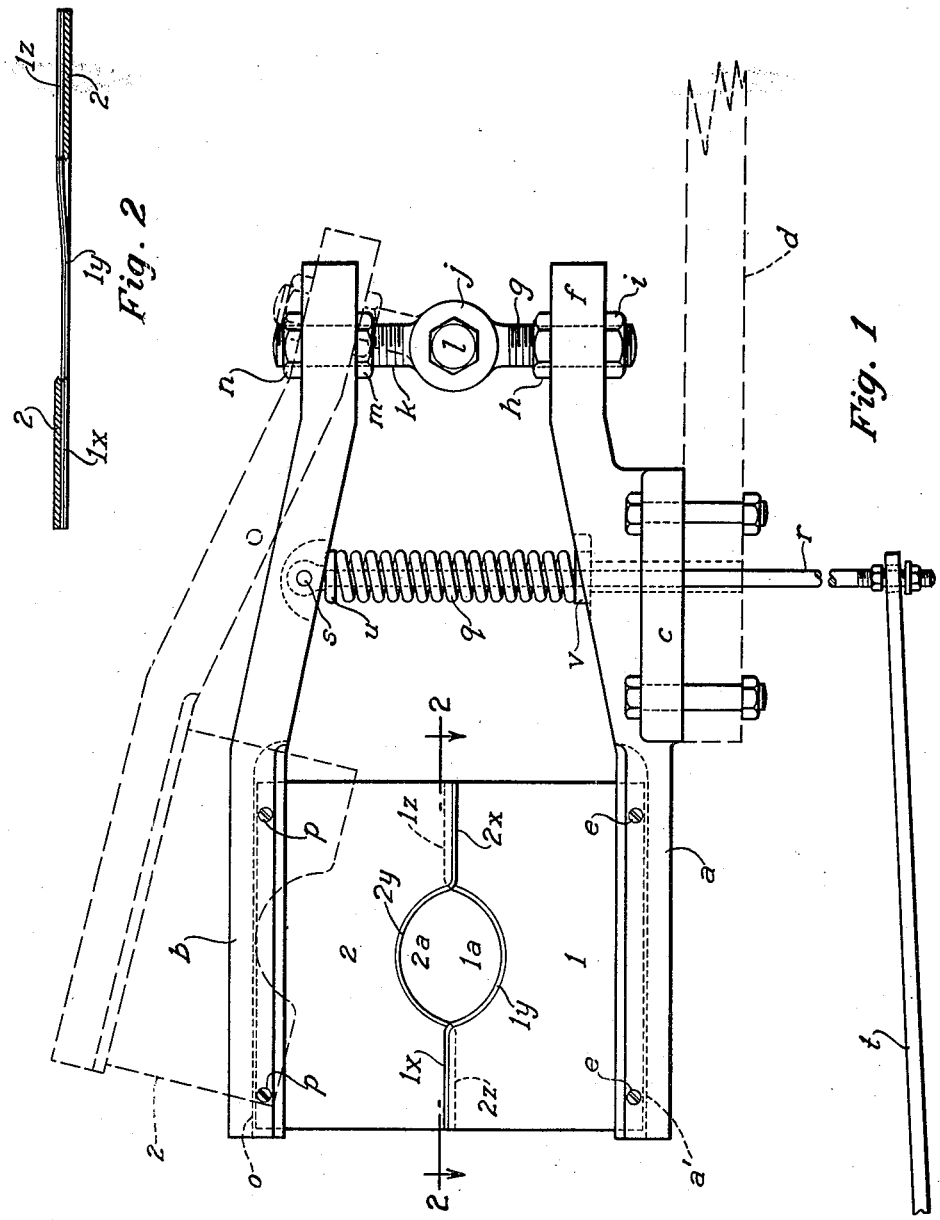

Inventor
Arthur B. McLauchlan
By T. J. Geisler
and H. Geisler
Attorneys

Patented Feb. 10, 1942

2,272,415

UNITED STATES PATENT OFFICE 2,272,415

PITTER

Arthur B. McLauchlan, Salem, Oreg.

Application July 30, 1940, Serial No. 348,379

8 Claims. (Cl. 146—28)

This invention relates to fruit pitters and, in particular, to devices for dividing fruit, such as peaches, plums, and the like, smoothly and completely into cut halves while removing the pit therefrom.

Various machines for this purpose have previously been invented and a few of these have found some acceptance in public use. The difficulty with many of these, however, is that they are more or less complicated in construction and thus expensive to manufacture; and a still more common objection to these as well as others, is that the pits of such fruits as plums and prunes, which have a more or less sharp edge at their perimeters, cannot be properly or securely held during the halving of the fruit, with the result that the pit, with one of the fruit halves clinging to it, will slip from the machine, requiring a second handling of that half of the fruit.

The object of this invention is to avoid these difficulties by providing a pair of simple, but specially-designed knives which will not only cut the fruit evenly in half, but, at the termination of the cutting, will clamp the pit in such position as to prevent the possibility of the pit slipping out from one side or the other.

Another particular object of this invention is to provide a pair of cooperating splitting knives which will have their edges so arranged and formed that pits with sharp perimeters will nevertheless be engaged by the knives and held firmly while the fruit halves, should the halves have a tendency to cling to the pit, are pulled away from the pit.

In some fruit splitters and pitters when too great a pressure is exerted there is a tendency for the jaws or blades of the pit engaging elements to become deflected with their pressure against the pit or stone of the fruit. A further object of this invention is to provide a pair of blades which will split the fruit and engage and hold the pit but which will overlap each other in such manner that they cannot become deflected even though they should be caused to bear with unusual pressure against the interposed pit or stone.

The manner in which I attain these and incidental objects through my invention will be apparent from the following brief description in which reference is to be had to the accompanying drawings.

In the drawings:

Figure 1 is a side elevation of a fruit pitting and halving machine employing one form of my improved splitting and pit-holding knives;

Figure 2 is a section corresponding to the line 2—2 of Figure 1, but drawn to a larger scale;

Figure 3:
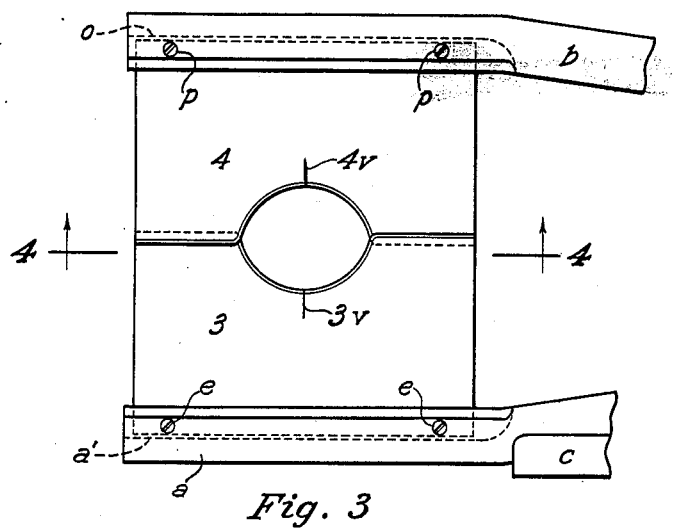
Figure 3 is a side elevation of a portion of the machine of Figure 1, with a slightly modified form of the knives.

Referring first to Figure 1, which illustrates a very simple machine suitable for carrying my invention into practise, a stationary lower jaw $a$ is made integral with, or securely attached to a suitable base $c$, the base $c$ in turn being bolted or clamped or otherwise fastened to a table or stand $d$, (shown in part in broken lines). One end of the stationary jaw $a$ is slotted as at $a'$ so that it may receive the bottom edge of the upstanding lower knife $l$ which is detachably secured in the said slot $a'$ by set screws $e$.

The opposite end of the stationary jaw member $a$ has a projecting ledge $f$ in which is disposed the threaded stem $g$ of a pivot post. The stem $g$ is adjustably secured by the clamping nuts $h$ and $i$. The top end of the stem $g$ is formed into a pivot bearing for the bottom end of a similar stem $k$ which is journaled for free arcuate movement on the central bolt $l$. The stem $k$ is similarly adjustably secured to an upper jaw member $b$ by clamping nuts $m$ and $n$.

The upper jaw member $b$ is similar in general form to the lower stationary jaw member $a$, and is provided with a slot $o$ for the upper knife blade 2, the blade 2 being removably retained in the slot by the set screws $p$. A rod $r$, which is pivotally connected to the upper jaw $b$ as at $s$, extends downwardly through a suitable clearance hole in the base $c$ and table top $d$ to pivotal connection with one end of a treadle $t$ or the like. A compression spring $q$ is mounted on the rod $r$ between the upper and lower jaws, the ends of the spring bearing against suitable washers $u$ and $v$. The compression spring $q$ constantly urges the upper jaw $b$ to the open position indicated by broken lines in Figure 1. Downward pressure on the treadle $t$ draws the upper jaw downward against the force of the spring $q$ thereby bringing the blade 2 into cooperative position with the blade 1, for the purpose of splitting the fruit and clamping the pit between the blades.

The two blades or knives 1 and 2, which constitute the main feature of the splitter and pitter in Figure 1, are identical in form and are preferably made from rectangular pieces of stainless steel or other suitable metal. A segmental portion, the size of which is slightly larger than one-half of the cross-sectional area of the fruit pit (for example one-half the size of a peach stone), is cut from the edge of each of the blades 1 and 2 as at 1a and 2a, midway of the length of the blades. The entire adjacent edges of the blades are beveled to form sharp cutting edges, these edges being indicated at 1x, 1y, and 1z for blade 1, and at 2x, 2y, and 2z for blade 2.

It will be noted in Figure 1 that the cutting edges of the two blades overlap at opposite sides when the blades are brought together. This is very important in my invention and adds materially in preventing transverse slippage of the fruit pit or stone when the two blades have been brought together against the pit or stone at the conclusion of the splitting or halving of the fruit. Furthermore this overlapping of the blades takes place before the blades begin to press against the pit or stone, since the cut out segmental portions are larger in area than the cross-section of the pit. This prevents any deflection of the blades after they contact the pit, which deflection would otherwise tend to occur with any appreciable pressure of the blades against the pit. This overlapping of the blades is shown clearly also in Figure 2. Prior to the installation of the blades in the jaws of the machine, the edge 1z of the lower blade 1 is offset from true alignment with the edge 1x a distance equal to the thickness of the blade, and similarly, the edge 2z (Figure 1) of the upper blade 2 is offset from its normal alignment with the edge 2x. The result of this formation, as apparent, is that when the upper blade 2 is moved downwardly into engagement with the lower blade, the edge section 2z will overlap the adjacent section 1x on the other face side of the blade. This arrangement consequently provides for the overlapping of the blades in a staggered manner without disturbing the alignment of the blades themselves. This staggered overlapping greatly reduces the tendency of the pit or stone to slip from the blades, which slippage is so apt to occur when one blade overlaps the other entirely on one side, as is the case with pitters heretofore in general use, and, especially, it prevents any deflection of the blades whatsoever.

In operation the peach, or other fruit, is placed centrally upon the lower blade 1 above the segmental aperture 1a, and is held on the blade between the two hands of the operator. The upper blade 2 is then brought downwardly by stepping on the treadle t, with the result that the blades will cut into the peach or fruit until the edge portions 1y and 2y of the blades are brought against the stone or pit. When this occurs the blades will be in the overlapping position illustrated in Figures 1 and 2. The peach or fruit is now completely cut into halves which may easily be detached from the stone or pit by a slight twisting motion exerted through the hands of the operator, the stone or pit being securely held by the blades. With some fruit, however, as for example, freestone peaches, it will not be necessary to touch the fruit after the splitting knives have contacted the fruit, since the fruit halves will drop away of their own accord. After the fruit halves have been removed, release of the treadle t will allow the spring q to force the upper jaw upward again thereby permitting the stone or pit to drop away.

While my blades, made in the form shown in Figures 1 and 2, will satisfactorily prevent slippling of peach stones and the like, they will not always hold sharp-rimmed fruit stones or pits, such as those of plums, sufficiently tight, especially if a twist or lateral pull is required in order to remove the halves of the fruit from the stone. For such pits I have provided the modified form of my blades illustrated in Figures 3, 4 and 5.

Figure 4:
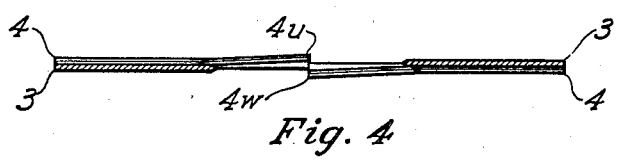
Figure 4 is a section corresponding to the line 4—4, in Figure 3, but drawn to a larger scale.
Figure 5:
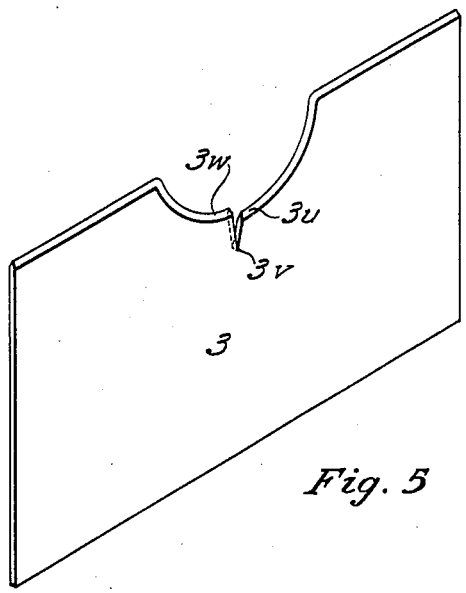
Figure 5 is a perspective view of one of the knives of Figure 3.

In each of these modified blades 3 and 4, an incision is made in the sharpened edge at the approximate center of the segmental aperture, thus as at 3v and 4v in Figure 3. The edges of each blade adjacent the incision 3v or 4v are bent outwardly in opposite directions. Thus the upper blade 4 will have the edges 4u and 4w on each side of the incision offset as shown in Figure 4. Similarly the edges 3u and 3w on each side of the incision 3v of the lower blade 3 will be offset as shown in Figure 5.

In other respects the blades 3 and 4 are formed similarly to the blades 1 and 2 of Figures 1 and 2 with the straight sections of their edges overlapping on opposite sides in staggered formation as previously described.

The advantage of breaking the continuity of the curved edges of the blades in the manner described resides in the fact that the offset sections of each blade will straddle the sharp elliptical rim of the plum stone or pit as the upper blade is drawn downwardly and will thus securely grip the stone while the cut halves of the plum are being pulled away, there being no possibility of side-wise shifting of the blades due to the bracing action of the oppositely-lapped edges.

While I have illustrated my invention as embodied in a simple form of fruit halving and pitting device, obviously my blades may be used in machines of various types. It is not my intention to restrict my invention to any particular type of machine either motor or manually operated. Furthermore, other minor modifications might be made in the blades themselves without departing from the principle of my invention. It is not my wish to limit my invention therefor, otherwise than as set forth in the claims.

I claim:

1. In a fruit pitter, a pair of jaw members, a fruit splitting blade attached to each jaw member, means for bringing said splitting blades together, a portion the size of which is made slightly larger than one-half the cross-sectional area of the pit of the fruit cut out from the cutting edge of each blade, said portions being centrally located, the edges of both blades adjacent said cut out portions being slightly offset, whereby said blades will overlap each other at opposite sides when said blades are being pressed into contact with an interposed fruit pit, said overlapping preventing any deflection of said blades, an incision made in each blade in said cut out portion, the edges of each blade adjacent said incision being bent slightly in opposite directions whereby to straddle any sharp rim of the pit.

2. In a fruit pitter, a pair of jaw members, a fruit splitting blade removably attached to each jaw member, means normally holding said blades spaced from each other, means for bringing said splitting blades together, a segmental portion cut out from the cutting edge of each blade, said portions being centrally located and said portions adapted to fit around and engage the fruit pit, the adjacent edges of said blades formed into sharp cutting edges, the edges of both blades adjacent said cut out portions being slightly offset, whereby said blades will overlap each other at opposite sides when said blades are being pressed into contact with an interposed fruit pit, said overlapping preventing any deflection of said blades, an incision made in each blade in the approximate center of said cut out portion, the edges of each blade adjacent said incision being bent slightly in opposite directions whereby to straddle any sharp rim of the pit.

3. In a fruit splitter and pitter, a pair of fruit-splitting blades, a segmental portion cut out from the cutting edge of each blade, said portions being adapted to engage opposite sides of the fruit pit when said blades are pressed together in the splitting and pitting operation, the cutting edges of each blade adjacent the segmental section being slightly offset in opposite directions and said blades placed with their corresponding offset portions oppositely arranged, whereby, when said cutting edges of the blades are caused to overlap, opposite faces of each blade will be brought to bear against the other blade at opposite ends respectively of said segmental section and will prevent said blades being forced apart laterally when said blades are pressed against the fruit pit.

4. In a fruit splitter and pitter, a pair of fruit-splitting blades, means for pressing said splitting blades together, a portion, the size of which is made slightly larger than one-half the cross-sectional area of the pit of the fruit, cut out from the cutting edge of each blade, said portions being adapted to engage opposite sides of the fruit pit when said blades are pressed together in the splitting and pitting operation, said portions adapted to fit around and engage the fruit pit, the cutting edges of each blade adjacent the cutout section being slightly offset in opposite directions and said blades placed with their corresponding offset portions oppositely arranged, whereby, when said blades are pressed into contact with an interposed fruit pit, their offset edges will overlap and opposite faces of each blade will be brought to bear against the other blade at opposite ends respectively of said cutout section and prevent the blades being forced apart laterally.

5. In a fruit splitter and pitter, a pair of fruit-splitting blades, a segmental portion the size of which is made slightly larger than one-half the cross-sectional area of the pit of the fruit removed from the cutting edge of each blade, said portions being adapted to engage opposite sides of the fruit pit when said blades are pressed together in the splitting and pitting operation, said portions adapted to fit around and engage the fruit pit, an incision made in each blade in said segmental portion, the edge of each blade for a short distance adjacent said incision being offset slightly in opposite directions, whereby to cause said offset parts to straddle any sharp rim of the pit at said incision.

6. In a fruit splitter and pitter, a pair of fruit-splitting blades, a portion, the size of which is made slightly larger than one-half the cross-sectional area of the pit of the fruit, cut out from the cutting edge of each blade, said portions being adapted to engage opposite sides of the fruit pit when said blades are pressed together in the splitting and pitting operation, said portions adapted to fit around and engage the fruit pit, the edges of said blades formed into sharp cutting edges, said blades so arranged that, when their cutout portions are pressed into contact with the interposed fruit pit, said blades will overlap each other at both ends of said cutout portions but opposite faces of each blade will bear against the other blade respectively at opposite ends of said cutout portion and thereby prevent lateral separation of the blades.

7. In a fruit splitter and pitter, a pair of fruit-splitting blades, one of said blades having a central cut-out portion in its cutting edge to enable said blades to fit around the fruit fit in the splitting of the fruit, the cutting edges of said blade adjacent said cut-out portion being slightly offset in opposite directions, whereby, when said pair of blades are pressed together in the splitting of the fruit, said offset edges of said first-mentioned blade will bear against opposite faces of the other blade respectively, and resist the tendency for said pair of blades to become forced apart laterally as said blades press against the fruit pit.

8. In a fruit splitter and pitter, a pair of fruit-splitting blades, a central pit-engaging portion cut-out from the cutting edge of each blade, said cut-out portions adapted to engage opposite sides of the fruit pit during the splitting of the fruit, the combined area of said cut-out portions being greater than the largest cross-sectional area of the pit so as to enable said blades to overlap at the end of the splitting operation, said blades so arranged that, when overlapping, their opposite faces will be brought to bear against each other respectively at opposite ends of said cut-out portions, whereby, when said blades are pressed against the fruit pit at the end of the splitting operation, the tendency of said blades to be forced apart laterally will be resisted.

ARTHUR B. McLAUCHLAN.